United States Patent
Soni

(10) Patent No.: US 6,742,111 B2
(45) Date of Patent: *May 25, 2004

(54) RESERVATION STATIONS TO INCREASE INSTRUCTION LEVEL PARALLELISM

(75) Inventor: Naresh H. Soni, La Jolla, CA (US)

(73) Assignee: STMicroelectronics, Inc., Carrollton, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/144,302

(22) Filed: Aug. 31, 1998

(65) Prior Publication Data

US 2003/0014613 A1 Jan. 16, 2003

(51) Int. Cl.[7] ................................................ G06F 9/06
(52) U.S. Cl. ...................... 712/217; 712/215; 712/216; 712/218; 712/23
(58) Field of Search ............................. 712/201, 23–24, 712/214–218; 709/1

(56) References Cited

U.S. PATENT DOCUMENTS

| | | | | |
|---|---|---|---|---|
| 5,519,864 A | * | 5/1996 | Martell et al. ............... | 712/215 |
| 5,530,816 A | * | 6/1996 | Holt ............................ | 712/217 |
| 5,651,125 A | * | 7/1997 | Witt et al. ................... | 712/218 |
| 5,778,210 A | * | 7/1998 | Henstrom et al. ........... | 712/218 |
| 5,798,918 A | * | 8/1998 | Georgiou et al. ............ | 700/28 |
| 5,901,302 A | * | 5/1999 | Witt et al. ................... | 712/215 |

* cited by examiner

Primary Examiner—Wen-Tai Lin
(74) Attorney, Agent, or Firm—Lisa K. Jorgenson; William A. Munck

(57) ABSTRACT

A data processing system having a distributed reservation station is provided which stores basic blocks of code in the form of microprocessor instructions. The present invention is capable of distributing basic blocks of code to the various distributed reservation stations. Due to the smaller number of entries in the distributed reservation stations, the look up time required to find a particular instruction is much less than in a centralized reservation station. Additional instruction level parallelism is achieved by maintaining single basic blocks of code in the distributed reservation stations. With a distributed reservation station, an independent scheduler can be used for each one of the distributed reservation stations. When the instruction is ready for execution, the scheduler will remove that instruction from the distributed reservation station and queue that instruction(s) for immediate execution at the particular execution unit. Multiple independent schedulers will provide greater efficiency when compared to a single scheduler which must contend with approximately 20–24 instructions that have increased dependency on one another.

37 Claims, 2 Drawing Sheets

RESERVATION STATIONS TO INCREASE INSTRUCTION LEVEL PARALLELISM

BACKGROUND OF THE INVENTION

1. Field of the Invention

The present invention relates to increasing the speed and efficiency of a microprocessor by increasing its instruction level parallelism (ILP). More particularly, the present invention is a technique for increasing the number of instructions executed per clock cycle (IPC) by adding distributed reservation stations that are organized in accordance with the basic blocks of code that are to be executed on the microprocessor.

2. Description of Related Art

In the computer industry there is a constant demand for ever faster and more efficient systems. This computer processing speed is dependent on the speed and efficiency of the microprocessor that controls the basic functions of the computer system. Today's microprocessors, such as the Pentium and PowerPC include multiple execution units, such as integer or fixed point units (also referred to herein as arithmetic logic units; or ALU), floating point units (FPU), Load/Store units, and the like, which allow instructions to be executed in parallel. One method of increasing computer performance has been to design microprocessors with additional execution units. However, in spite of adding more execution resources, the instructions executed per clock cycle has remained at an average of 0.9 using an integer benchmark based on three (3) ALUs. Ideally, for three (3) ALUs, the IPC should be three, i.e. an instruction executes on each ALU during one clock cycle.

Typically, reduced IPC is due to inefficient coding, i.e. the compiler is not optimized to increase instruction level parallelism or memory subsystem latency, i.e. microprocessors instructions must wait until the information is stored to or loaded from memory before they can be executed. In most computer systems the speed of the memory bus which transmits the information between the execution units and memory is significantly slower than the microprocessor clock. The ratio of microprocessor core frequency to bus frequency is often three to four. For example, while a microprocessor clock may run at 133 MHZ, the system bus may only operate at 33 MHZ. Therefore, it can be seen that instructions which are dependent on a memory operation may take four times as long to complete as instructions which are independent of memory. One example is a cache miss, where the required data is not contained in the level one (L1) typically contained in the microprocessor core. In this case, the data must be received from a level two (L2) cache that is usually on a separate integrated circuit chip. If the data is not in the L2 cache (L2 cache miss), then it must be retrieved from main memory. Those skilled in the art will understand that there is a very high cost in terms of system speed and performance due to memory latency, particularly cache misses.

Modem microprocessors may include a reservation station which is basically a queue that stores instructions which are awaiting execution. When a cache miss occurs, the particular instruction(s) awaiting the operand information from memory will wait in the reservation station until the information is available. This wait period will have a detrimental affect on system performance. Most common architectures use a centralized reservation station scheme that buffers the instructions to be scheduled for execution. The depth of conventional reservation stations can be on a critical path if an instruction to be scheduled in a single cycle in a high frequency processor. As the depth of the reservation is increased, the time it takes to look up and fetch an instruction that is ready for execution also increases.

Other types of architectures use individual reservation stations where each execution unit in the microprocessor has an assigned reservation station. That is, each floating point unit (FPU), fixed point unit (FXU) or the like will have a corresponding reservation station. These reservations stations are usually shallow and can hold 2–3 instructions. Another type of reservation station configuration is group reservation stations. In this case the same reservation station holds instructions for a whole group of execution units, each of which execute the same type of instructions. For example, one reservation station may hold instructions for one or more FPU units, while another reservation station may hold integer instructions for multiple FXUs. In this case, each reservation station will only hold those specific types of instructions that can be executed by the units in the group.

However, none of these current architectures include reservation stations that are organized at the basic block level, which provides independence between instructions at each station, thereby increasing instruction level parallelism and decreasing overhead associated with look up time. Thus, it can be seen that a need exists for a microprocessor that minimizes the time instructions are waiting to be executed.

SUMMARY OF THE INVENTION

In contrast to the prior art, the present invention utilizes a distributed reservation station which stores basic blocks of code in the form of microprocessor instructions.

The present invention is capable of distributing basic blocks of code to the various distributed reservation stations. Due to the smaller number of entries in the distributed reservation stations, the look up time required to find a particular instruction is much less than in a centralized reservation station.

Further, additional instruction level parallelism is achieved by maintaining single basic blocks of code in the distributed reservation stations. Generally, more independent instructions are found in basic blocks. This is due to the fact that instructions which are grouped together are less likely to use the same resources, e.g. registers and memory locations, therefore, they will exhibit more data, control and resource independence. In contrast, when instructions are not associated with one another (e.g. in different basic blocks) they are more likely to use the same processing resources (execution units), data resources (registers) and be subject to control dependencies (branching), thus causing a greater chance of dependency that may force instructions to wait for resources to become available.

Also, with a distributed reservation station, an independent scheduler can be used for each one of the distributed reservation stations. When the instruction is ready for execution, the scheduler will remove the instruction from the distributed reservation station and arbitrate for ownership of the appropriate execution unit. When ownership is awarded to the scheduler, then it will queue that instruction (s) for immediate execution at that particular execution unit. It can be seen that multiple independent schedulers will provide greater efficiency than a single scheduler which must contend with approximately 20–24 instructions that have increased dependency on one another.

Therefore, in accordance with the previous summary, objects, features and advantages of the present invention will become apparent to one skilled in the art from the subsequent description and the appended claims taken in conjunction with the accompanying drawings.

DETAILED DESCRIPTION OF THE PREFERRED EMBODIMENTS

Figure 1:
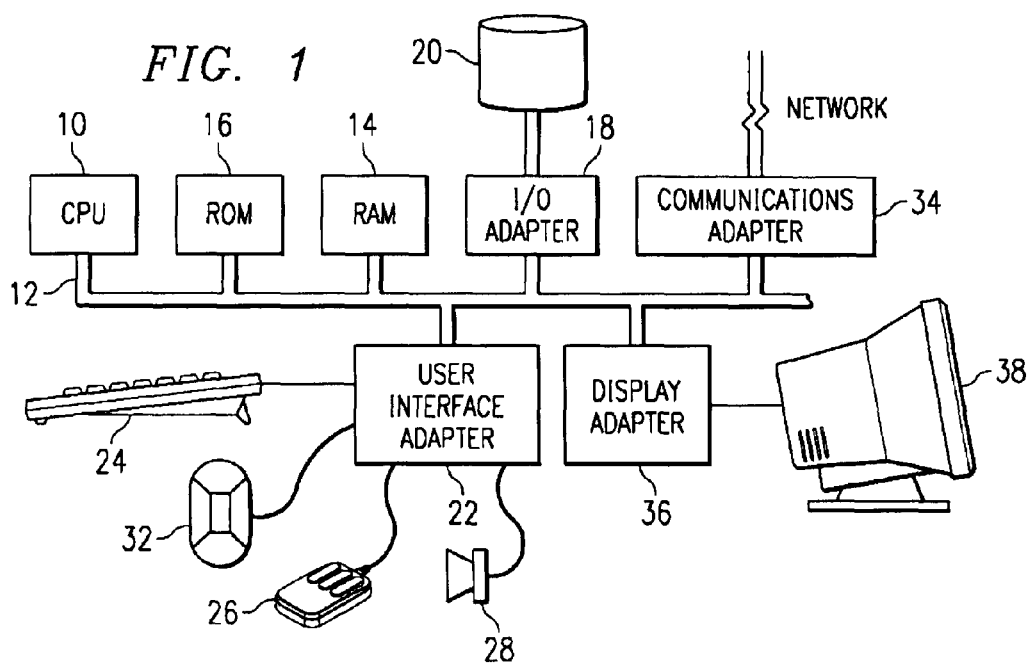
FIG. 1 is a block diagram of a data processing system capable of using a microprocessor embodying the present invention.

Generally, basic blocks are defined as the microprocessor instructions between branch instructions. Once fetched and decoded, the basic blocks are typically stored in a centralized reservation station. Conventional central reservation stations are 20–24 entries deep, whereas the distributed reservation stations of the present invention are 4–5 entries deep. It has been found that, on average, basic blocks contain 4–5 instructions.

In particular, the basic block is a concept arising from compiler technology. It denotes a straight-line code sequence that can only be entered at its beginning and left at its end. Conditional branches and branch target addresses break program into basic blocks. An example of a basic block follows:

(1) add r3, r1, r2;

(2) sub r4, r1, r1;

(3) mul r5, r3, r4;

(4) mul r7, r6, r6;

(5) jn negproc.

In this case, four arithmetic instructions are followed by a conditional branch wherein the program jumps to another basic block when the condition code (flag) is negative, based on the results of the previous multiply instruction. More particularly, the first instruction (1) is an ADD instruction that adds the contents of register 3 (R3) to the contents of register 1 (R1) and stores the sum in register 2 (R2). A second instruction (2) subtracts the contents register 4 (R4) from register 1 (R1) and stores the result in register 1 (R1). The third instruction (3) multiplies the number in register 5 (R5) with the contents of register 3 (R3) and places the product in register 4 (R4). Another MULTIPLY instruction (4) multiplies the contents of register 7 (R7) with the contents of register 6 (R6) and stores the result in register 6 (R6). It should be noted that the majority of arithmetic and logical instructions will set a condition code, or flag, which is subsequently used by flow control instructions, such as branches. Typically, these codes include "greater than", "less than", "equal to", and "overflow". Instruction (5) is a jump instruction that will cause the microprocessor to jump to a certain instruction (at a particular address) if the condition is true. In this example, if the "less than" (negative) condition code is set, then the condition is met (true) and the next instruction will be fetched from the address in the jump instruction. If however the "less than" condition is not true, then the processor will continue processing instructions following the jump.

It has been found that change of control instructions (jumps, branches) make up approximately 20% of the code. This means that about one in five instructions is a flow control instruction and therefore basic blocks contain, on average, approximately five (5) instructions.

Generally, basic blocks of instructions are constructed by the microprocessors during branch prediction. During the instruction fetch stage, the boundaries between instructions within the first 16 byte block are identified and marked. In addition, if any of the instructions are branches, the memory address that they were fetched from (for up to four branches within the 16 byte block) are presented to the branch target buffer (BTB) 42 for branch prediction.

The present invention utilizes this information and optimizes the depth of the distributed reservation stations at 4–5 entries to decrease look up time and to increase instruction independence and correspondingly increase instruction level parallelism.

Instruction scheduling is the reduction of dependencies between instructions to allow for greater instruction throughput during execution. When instructions are processed (issued, renamed, executed and the like) in parallel, it is often necessary to detect and resolve dependencies between instructions. There are two basic approaches to scheduling, static and dynamic. Static detection and resolution is accomplished by the compiler, which avoids dependencies by reordering the code. Then the output of the compiler is reordered into dependency-free code. In contrast, dynamic detection and resolution of dependencies is performed by the processor. If dependencies have to be detected in connection with instruction issue, the processor typically maintains two gliding windows. The issue window contains all prefetched instructions which are intended for issue in the next cycle, while instruction which are still in execution and whose results have not yet been produced are retained in an execution window. In each cycle, all the instructions in the issue window are checked for data, control and resource dependencies with respect to the instructions in execution. There is also a further check for dependencies among the instructions in the issue window. As a result of the dependency checks, zero, one or more instructions will be issued to the execution units. For further information see "Advanced Computer Architectures; A Design Space Approach", by Sima, Fountain, Kacsuk, pages 107–110, published by Addison-Wesley, 1997, hereby incorporated by reference.

The present invention provides for an independent scheduler for each reservation station. When the instruction is ready for execution, the scheduler will remove that instruction from the distributed reservation station and queue it in front of the appropriate execution unit. As noted above, the scheduler for a particular reservation station will include arbitration circuitry to arbitrate for access to the appropriate execution unit. For example, if one of the floating point instructions, e.g. FADD, in reservation station 50 has received its operand information, then scheduler 56 will arbitrate for access to FPU 70. When ownership of FPU 70 is awarded to scheduler 56, then the FADD instruction will be removed from reservation station 50 and placed in the FPU instruction shelf.

Referring to FIG. 1, a typical data processing system is shown which may be used in conjunction wit the present invention. A central processing unit (CPU) 10 such as the Pentium II microprocessor, commercially available from Intel Corp. is provided and interconnected to the various other components by system bus 12. It should be noted that the reservation stations of the present invention will be included in CPU 10. Read only memory (ROM) 16 is connected to CPU 10 via bus 12 and includes the basic input/output system (BIOS) that controls the basic computer functions. Random access memory (RAM) 14, I/O adapter 18 and communications adapter 34 are also interconnected to system bus 12. I/O adapter 18 may be a small computer system interface (SCSI) adapter that communicates with a disk storage device 20. Communications adapter 34 interconnects bus 12 with an outside network enabling the data processing to communication with other such systems, via the internet, local area network (LAN), or the like. Input/output devices are also connected to system bus 12 via user interface adapter 22 and display adapter 36. Keyboard 24, track ball 32, mouse 26 and speaker 28 are all interconnected to bus 12 via user interface adapter 22. Display monitor 38 is connected to system bus 12 by display adapter 36. In this manner, a user is capable of inputting to the system through the keyboards 24, track ball 32, or mouse 26 and receiving output from the system via speaker 28 and display 38. Additionally, an operating system, such as one of the versions of the Windows operating system, commercially available from Microsoft Corporation is used to coordinate the functions of the various components shown in FIG. 1.

Figure 2:
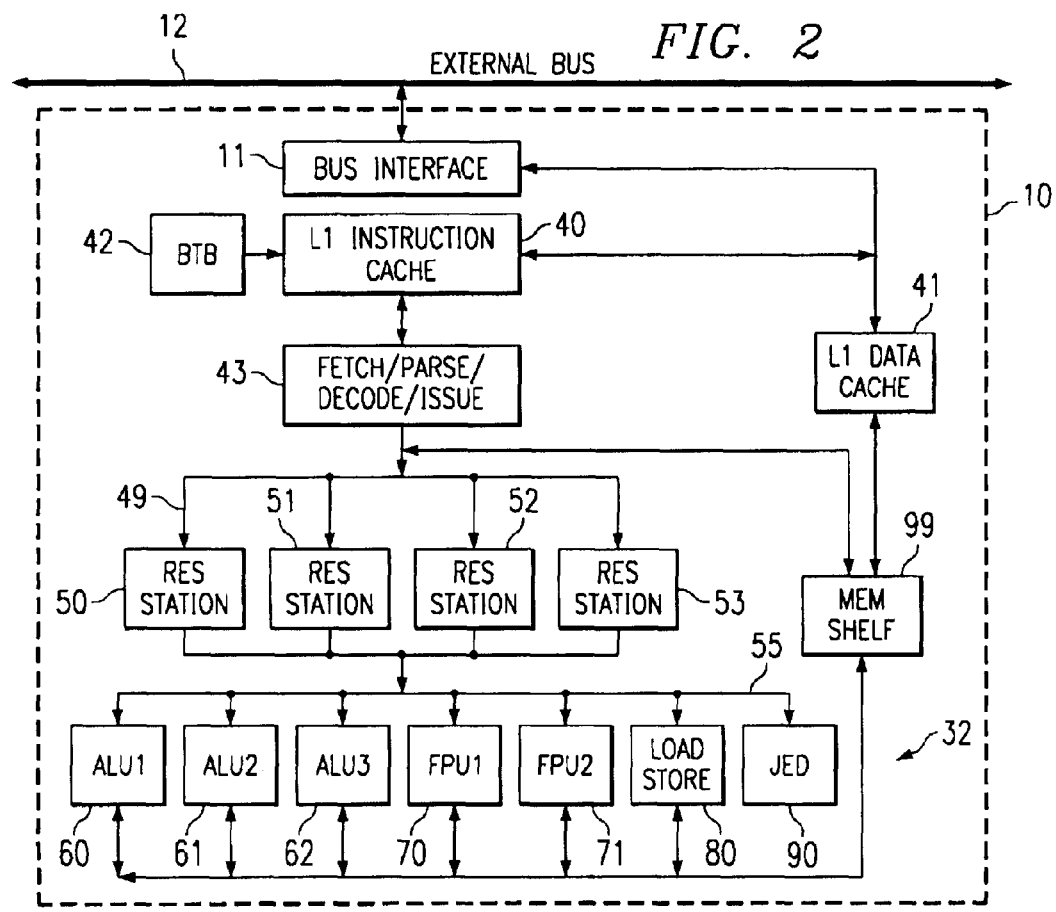
FIG. 2 is a block diagram of a microprocessor that includes the distributed reservation stations of the present invention.

Referring to FIG. 2, a block diagram of a microprocessor is shown which is capable of implementing the distributed reservations stations of the present invention. In a preferred embodiment a microprocessor compatible with the Intel architecture is used to implement the present invention. However, it should be noted that other types of microprocessors, such as the PowerPC microprocessor commercially available from IBM Corporation and Motorola Corp., the Alpha microprocessor available from Compaq Corporation and the SPARC microprocessor available from Sun Microsystems are also capable of implementing a techniques disclosed herein in conjunction with the present invention.

In FIG. 2, bus 12 is shown and which is considered to be external of microprocessor 10. It should be noted that, CPU 10 will also be referred to herein as microprocessor 10. In some cases, a central processing unit will include components in addition to a microprocessor, such as a memory controller, or the like. However, for the purposes of describing the present invention, and for simplicity, CPU 10 will be considered to include only a microprocessor. Bus interface unit (BIU) 11 interfaces the microprocessor components with system bus 12. Main memory 14 and the various input/output devices 26, 28, 32, via adapter 22, are also connected to bus 12. Control, address and data information is transmitted from microprocessor 10 onto bus 12 via BIU 11. Further, control, address and data signals from memory 14 and I/O adapter 22 are received by BIU 11 for use by microprocessor 10. It should be noted that the control, address and data information will include microprocessor instructions, as well as operand data which will be manipulated by the instructions.

Microprocessor 10, like most modern microprocessors, includes a hierarchical memory subsystem. The memory subsystem usually includes a level one (L1) instruction cache 40 and data cache 41 which provide the instructions and data to the execution units (FPU 70, 71, Integer Unit 60, 61, 62 and Load/Store unit 80). In many data processing systems, an off chip level two (L2) cache (not shown) is provided. While an L2 cache is smaller than main memory 14, retrieving information likely to be used by the processor from an L2 cache is much faster than loading the information from main memory. Main memory 14 is the last level of storage in the memory subsystem before the hard disk. Memory 14 is the largest storage area, but also requires the greatest number of cycles to be accessed by the microprocessor.

More particularly, level one (L1) instruction cache 40 is included in microprocessor 10, as shown in FIG. 2. After retrieving them from main memory 14, L1 instruction cache 40 stores microprocessor instructions that are to be provided to the microprocessor execution units.

L1 data cache 41 is also provided, as shown in FIG. 2, and can be configured to run in write-through mode, or in a higher performance write-back mode. The write-back mode optimizes performance of the CPU core by eliminating bus bottlenecks caused by unnecessary external write cycles. Write-through cache architectures require that all writes to the cache also update external memory simultaneously. These unnecessary write cycles create bottle necks which can result in CPU stall and adversely impact performance. In contrast, a write-back architecture allows data to be written to the cache without updating external memory. With a write-back cache external write cycles are only required when a cache miss occurs, a modified line is replaced in the cache, or when an external bus master requires access to data. L1 data cache 40 stores instructions only in order to provide faster and less complex retrieval of instructions. Four-way set associative architecture and a least recently used (LRU) algorithm are used in cache 41. Of course, cache 41 can be operated in write-through mode when desired. Depending on the cache architecture, the line size of L1 data cache 41 may be 8 bytes, 16 bytes, 32 bytes, or the like, and new lines are only allocated during memory read cycles. Valid status is then maintained on a 16 byte cache line basis, but modified or "dirty" status for write-back mode is maintained on a 4-byte (double word) status. Therefore, only the double words that have been modified are written back to external memory when a line is replaced in the cache. The CPU can access the cache in a single internal clock cycle for both reads and writes. As noted above, instructions and data are stored separately in the L1 cache in order to increase performance.

Memory shelf 99 is essentially a memory queue that stores instructions and data after it has been received from the memory subsystem and prior to it being written from the execution units to the memory subsystem. Memory shelf 99 also includes a snooping mechanism that ensures coherency of data throughout the memory subsystem.

A branch target buffer (BTB) 42 is used to predict the target address of a "branch" or "jump" instruction. That is, the target address is precalculated (predicted) and stored in buffer 42. Thus, when an unconditional branch is taken, or a conditional branch instruction is encountered, the address for the next (non-sequential) instruction is already known and available for use by the corresponding execution unit (floating point or integer).

For example, a Pentium type microprocessor uses dynamic branch prediction. As each prefetched instruction is passed into the dual instruction pipelines, the memory address it was fetched from is used to perform a lookup in the BTB 42, which is a high-speed lookaside cache. If there is a branch and it misses BTB 42, it is predicted as not taken and the prefetch path is not altered. If a hit occurs in the BTB 42, then the state of history bits in BTB 42 are used to determine whether the branch should be predicted as taken or not taken. When the branch is executed, its results (whether it was taken or not and, if taken, the branch target address) are used to update BTB 42. The branch target buffer makes its predictions on the basis of basic blocks, i.e. block size, block type, target address and whether the branch will be taken or not taken. If the branch is incorrectly predicted, the instructions in the pipeline(s) and those which are currently-active and have been prefetched, must be flushed.

Instruction cache 40 is connected to an instruction fetch/parse/decode/issue unit 43 which provides the microprocessor instructions to reservation stations 50, 51, 52, and 53, and ultimately to execution units 60–62, 70, 71 and 80.

As noted by its name fetch/parse/decode/issue unit 43 performs several functions. First, it retrieves the instructions and loads them into an internal buffer by "prefetching" them from the instruction stream prior to their being fetched. As the fetched instructions are dispatched through the pipeline, new instructions are loaded into the buffer. This ensures that the execution units will always have a continuous supply of instructions and prevents any "bubbles" from occurring in the pipeline. Unit 43 also parses the complex instruction set computer (CISC) instructions into segments and identifies boundaries between the individual instructions. The parsed instructions are then decoded into reduced instruction set computer (RISC) instructions, or micro-ops, which are then placed in a decoded instruction queue to be subsequently issued to the execution units. It should be noted that in some cases the CISC instructions will be translated into more than one RISC instruction. However, in some cases one CISC instruction will correspond to a single RISC instruction. For the discussion purposes herein, one CISC instruction will be deemed to yield one RISC instruction when translated.

As noted above, in addition to being fetched by unit 43, the instructions are also decoded and issued, or dispatched. From the fetch/parse/decode/issue unit 43, the instructions are then provided to the various reservation stations 50, 51, 52 and 53 along an internal bus 49. It should be noted that the diagram of FIG. 2 shows four (4) reservation stations for six (6) execution units, however, the present invention contemplates many other different configurations of reservations stations and execution units. As will be discussed in greater detail below, reservation stations 50–53 will be approximately four to five entries deep and will store basic blocks of instructions which are awaiting execution on any one of the execution units. A scheduler having logic to determine the existence of dependencies between instructions may also be included in unit 43. In this manner, instructions can be directly provided to an execution unit when no dependencies are present.

Bus 55 connects the reservation stations with the execution units and is configured such that any instruction in any one of the reservations stations can be processed by any of the execution units. In particular, the reservation stations are not associated with any particular execution unit(s).

The microprocessor of FIG. 2 shows six (6) execution units and includes arithmetic logic units ALU1, ALU2, ALU3 having reference numeral 60, 61 and 62, respectively, which may also be referred to herein as the integer units (IU) or fixed point units (FXU). Integer instructions, such as add (ADD), multiply (IMUL), move (MOV) and the like are also issued by unit 43 to integer units 60, 61 and 62. In addition to executing other fixed point instructions and performing integer calculations, Integer units 60, 61, 62 may perform address calculations for the load and store instructions.

Floating point units 70 and 71 (FPU1, FPU2) perform the floating point operations and calculations that are often required for more scientific and technical applications. Additionally, the floating point units execute the multimedia extensions (MMX) to the Intel architecture. Floating point units 70 and 71 receive the issued floating point instructions from unit 43 for execution thereon. The floating point units 70, 71 include eight 80 bit registers with a 64 bit interface which are capable of parallel execution. The exemplary Intel architecture floating point unit 70, 71 uses the x87 instruction set and is compatible with IEEE standard 754.

Load/store unit 80 is also included which is responsible for executing the load instructions which provide information (data and instructions) from the memory subsystem to the microprocessor pipeline. Store instructions are also included which write information from the microprocessor to the memory subsystem. For example, load/store instructions are issued to load/store unit 80 for execution and memory address calculation, and to memory shelf 99, which may include a memory control unit, or the like, for scheduling. Load/store functions are implemented by load/store unit 80 which executes load and store instructions on an arithmetic logic unit (ALU). Load and store instructions include load string (LODS), load task register (LTR), move data (MOV), and the like. Store instructions include store task register (STR), store string (STOS), and the like. Generally, load instructions retrieve data and/or instructions from cache/memory and place the information in one of the microprocessor registers, while store instructions place data and/or instructions into a cache/memory location from the microprocessor registers. In some cases integer units 60, 61, 62 may be used to perform memory address calculations.

A jump execution unit (JEU) 90 is also shown in FIG. 2, which is also often referred to as a branch execution unit. Jump execution unit 90 will process control transfer instructions such as branches, jumps and moves. Typically, when a jump instruction is encountered, JEU 90 will evaluate a condition code and jump to an out of sequence instruction based upon the state of the condition. In some cases the jump will occur if the condition is true, other times a branch will be taken when the condition is false. If the condition is such that the branch is not taken, then execution of instructions will continue sequentially. A typical jump, or branch instruction will include an opcode that describes the type of instruction, e.g. branch conditional, branch conditional to count register, delayed branch, jump on equal/zero, jump on not overflow, jump on parity even, or the like. The instruction also includes a field that specifies which bit in a condition register, or flag register (in the case of Intel architecture) is to be used for the condition of the jump, or branch. The target address is also included in the instruction such that if the condition is true, then the instruction stream jumps to the specified address for next instruction to be executed.

The condition codes are bits in the condition register or flag register that are set during execution of other instructions. Generally, the condition codes include greater than, less than, equal to or overflow. When, for example, a compare instruction (CMP) is executed the "equal to" bit will be set to logical 1 when the contents of two registers are equal. Then, the next jump on equal (JE) instruction will look at the equal bit. If the equal to bit is a one, indicating that the contents of the compared registers were equal to one another, then the jump is taken and the next instruction is fetched from the target address in the jump instruction. If the equal bit is a logical zero, then the jump is not taken and the next instruction sequentially after the jump instruction is executed.

Memory management is provided by calculating a physical address from an effective address using a particular addressing mode. The CPU then uses the physical address to actually address specific locations in the physical memory device(s). A memory management unit includes a translation lookaside buffer (TLB), which is a cache for the paging mechanism, is normally included in the L1 cache. In a typical microprocessor, similar to the one shown in FIG. 2, the TLB is a page table cache that automatically keeps the most commonly used page table entries in the processor. An address calculation unit is also provided for memory management operations and is used to calculate the physical address by computing an offset address (effective address). Generally, the effective address is calculated by adding together up to three values: a base, an index and a displacement. The base, if present, is the value in one of the 32 bit general registers at the time of the execution of the instruction. The index is also a value contained in one of the 32 bit general purpose registers. The index differs from the base in that the index is first multiplied by a scale factor of 1, 2, 4 or 8 before the summation is made. The third component added to the memory address calculation is the displacement which is a value of up to 32 bits which is supplied as part of the instruction.

For additional information see the Intel Architecture Software Developer's Manual, Volume 2, Instruction Set Reference, published by Intel Corp., 1997; and Pentium Pro and Pentium II System Architecture, second edition, published by MindShare, Inc., 1998, both hereby incorporated by reference.

Figure 3:
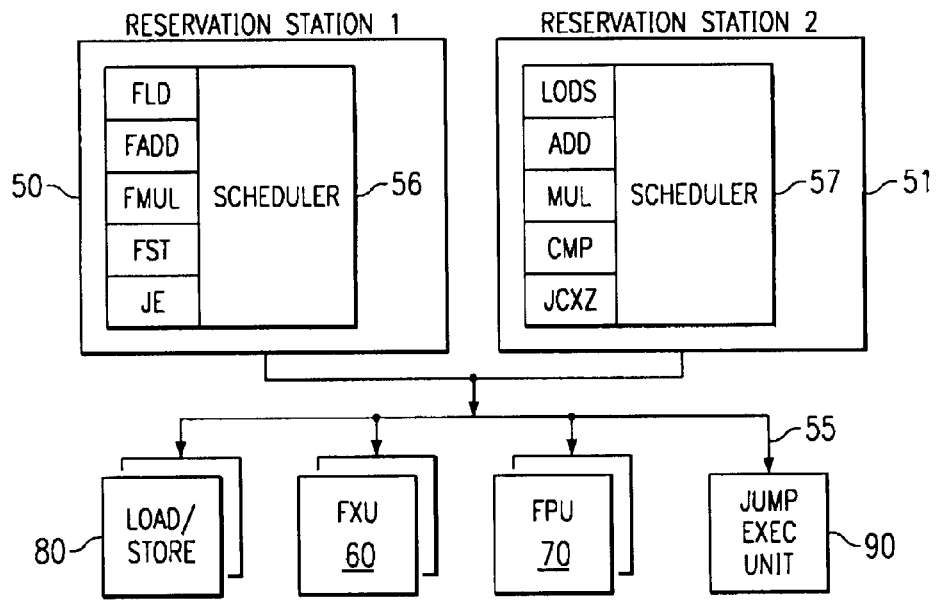
FIG. 3 is a more detailed block diagram which shows the individual entries in the reservation stations and various representative execution units.

FIG. 3 illustrates a more detailed block diagram of reservation stations and execution units as contemplated by a microprocessor implementing the present invention. For simplicity and ease of understanding two (2) reservation stations 50 and 51 are shown in conjunction with three (3) execution units 60, 70 and 80. Of course, other combinations, in addition to those shown in FIG. 2 are contemplated and will operate in accordance with the present invention.

FIG. 3 is a more detailed view of the reservation stations and execution units of the microprocessor of the present invention. In particular, reservation station 50 is shown having a basic block of instructions stored therein which are awaiting processing by one of FXU 60, FPU 70, Load/Store (L/S) 80 or JEU 90. Reservation station 51 is also shown which includes another basic block of instructions. These basic blocks are organized to include instructions which have been predicted to follow any branches that were predicted to be taken by the branch prediction logic in BTB 42, as discussed above.

Scheduler 56 is included in reservation station 50 and scheduler 57 is included in reservation station 51. As noted above, the present invention allows individual schedulers to be provided in each one of the distributed reservation stations. Schedulers 56, 57 include logic circuitry which determines whether any dependencies exist between the instructions stored in their respective reservation stations 50, 51. As noted above, these dependencies may include data, control or resource dependencies. In some cases, instructions may be present in the reservation stations, but have not yet been provided with the operand data that is required for execution. In accordance with one aspect of the present invention, the look up time required by schedulers 56, 57 is minimized since the depth of the reservation stations are 4–5 entries, rather than the 20–24 entries of many convention reservation stations. Those skilled in the art will appreciate that the smaller number of entries required to be checked by the scheduler will translate into more instructions being executed per cycle, i.e. increased IPC and clock frequency.

The instructions included in the basic block stored in reservation station 50 include the following.

| Floating Point Load | FLD |
| Floating Point Add | FADD |
| Floating Point Multiply | FMUL |
| Floating Point Store | FSTOR |
| Jump on Equal | JE |

In this case the instructions in the basic block are executed by three (3) different execution units. The L/S unit 80 will load operand data, or the like into a floating point register (FLD). The floating point add and multiply instruction will then be executing on FPU 70. L/S 80 then stores a result from one of the floating point registers (FSTOR). Jump execution unit 90 then executes the jump on equal (JE) by evaluating a bit in the flag register. If the result, as indicated by the condition code, is equal (true) then a jump occurs to a target address in the jump instruction.

The basic block of instructions stored in reservation station 51 includes the following.

| Load String | LODS |
| Add | ADD |
| Multiply | MUL |
| Compare | CMP |
| Jump on CX equal zero | JCXZ |

The instructions in the basic block in reservation station 51 are also executed by three (3) different execution units. The L/S unit 80 will load a sequence (string) of operand data, into at least one general purpose register accessible by the other execution units (LODS). The FXU 60 then executes the add and multiply instructions. The CMP instruction then compares the contents of certain registers with one another and sets a condition code in accordance with that comparison. Jump execution unit 90 then executes the jump on CX zero (JCXZ) by evaluating a bit in the flag register. If the bit indicates that the condition is true (value in the CX register is equal to zero) then a jump occurs to a target address in the jump instruction.

Figure 4:
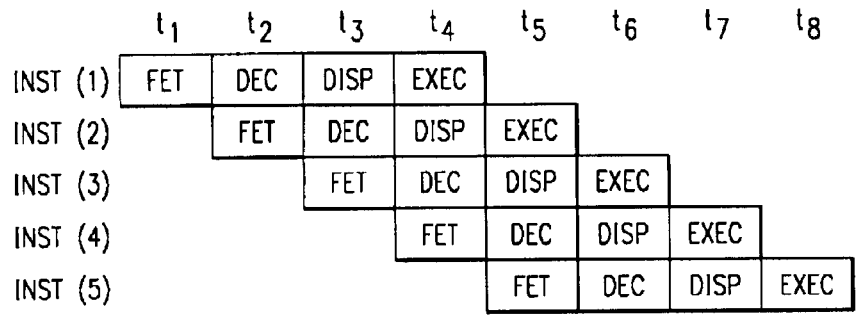
FIG. 4 is a timing diagram showing the parallel execution possible with a four stage pipeline.
Figure 5:
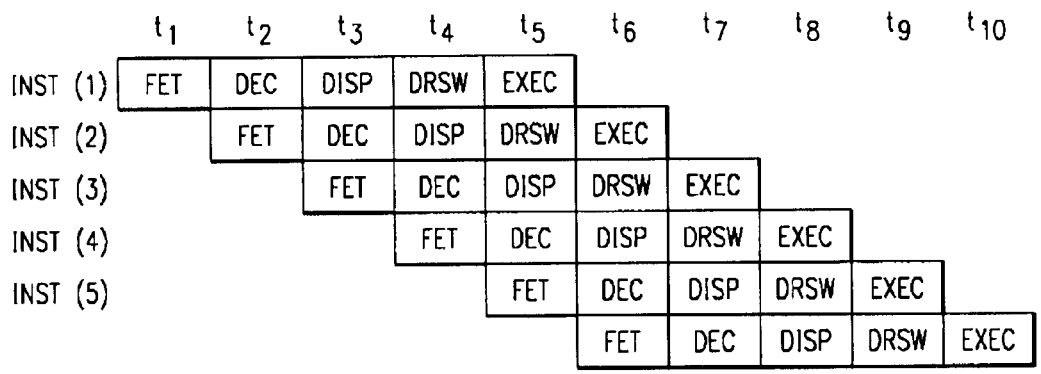
FIG. 5 is another timing diagram showing the increased parallelism which can be provided by the microprocessor of the present invention when an additional stage is added to the pipeline.

Referring to FIGS. 4 and 5, the improvements in instruction level parallelism (ILP) is shown. FIG. 4 shows a four (4) stage pipeline which includes fetch, decode dispatch and execute stages. It can be seen that at cycle 4 (t4) the pipeline is full and four instructions are being processed simultaneously. In FIG. 5 an additional pipeline stage has been added, distributed reservation station write (DRSW). Thus, at cycle 5 (t5) the pipeline is full and five instructions are being processed simultaneously. When additional pipeline stages are used, higher frequency and concurrency can be achieved and thus a higher performance can be expected. It should be noted that increasing the number of stages in the pipeline, usually, causes higher penalty for branch mispredictions.

However, the present invention addresses this problem by organizing the instructions in the distributed reservation stations by basic blocks. This has several benefits, such as: limiting the depth of each reservation station to only approximately 4–5 entries (average size of a basic block), causing decreased loop up time; instructions in a basic block are much more independent (making them more immune to the data and control dependencies that may have been caused by the added pipeline stage). Therefore, the present invention allows for the higher performance additional pipeline stages, while minimizing any adverse effects associated with increasing the number of stages in the pipeline.

The following code example shows how this invention can accomplish better performance:

```
Code Section 1
1 mov eax, dword ptr [ebx]
2 mov ecx, ebx
3 mov esi, dword ptr [eax+08]
4 call 300841FC Code Section 2
5 mov eax, dword ptr [ebp-60]
6 xor esi, esi
7 cmp eax, dword ptr [ebp-5C]
8 jne 304B9D01

Code Section 3
9 inc [ebp-5C]
10 push 00000001
11 pop esi
12 mov eax, dword ptr [ebp-20]
13 mov ecx, dword ptr [ebp+18]
14 push 00000001
15 add eax, ecx
16 sub eax, dword ptr [ebp-24]
17 push eax
18 push [ebp-24]
19 lea eax, dword ptr [ebp+FFFFFE80]
20 push [ebp-1C]
21 push eax
22 call 30078F21

Code Section 4
23 push eax
24 lea eax, dword ptr [ebp-24]
25 push eax
26 lea eax, dword ptr [ebp-60]
28 push eax
29 call 30098522

Code Section 5
30 test esi, esi
31 je 304B9B8F

Code Section 6
32 mov eax, dword ptr [ebp-5C]
33 cmp eax, dword ptr [ebp-60]
34 jle 304B9B8F Code Section 7

35 dec [ebp-5C]
36 jmp 304B9B8F
```

The above code is a real life example of instructions that may be processed on a microprocessor and is divided into code sections 1 through 7. The code sections are divided by a control transfer instruction such as a branch or jump (conditional, unconditional or a call to a subroutine). In the previous examples, eax, ebx, ecs, esi, ebp and the like are registers in the Intel architecture register set. As can be observed from the above code, the number of instructions in a code section is usually four or less. The distributed reservation stations of the present invention can each contain 4–5 instructions, depending on the implementation, and a dedicated scheduler. Of course, reservation stations having a depth other than 4 or 5 entries are contemplated by the present invention. For code sections having greater than 4–5 instructions, scheduling can occur from the instruction cache when no dependencies exist.

By splitting the instruction stream into basic blocks by code section, instructions 1, 2, 3, 9, 10, 14 can be scheduled at the same time in the first clock cycle since there are no dependencies between these instructions. Instructions 1, 2, 3 and 9, 10, 14 are from the same respective basic blocks (instructions 1, 2, 3 in code section 1 and instructions 9, 10, 14 in code section 3). Thus, it can be seen that greater independence between instructions is present when the instructions are in the same basic block. When the instructions 1, 2, 3, 9 complete execution, instructions 5, 6, 13, 18, 20 can be scheduled. It can be seen that instructions 5, 6, 13, 18, 20 are from different basic blocks. Instructions 5, 6 are from the same basic block (code section 2) and instructions 13, 18, 20 are also from the same basic block (code section 3). Thus, the present invention demonstrates the high degree of independence between instructions in a block. Hence, it can be seen that a high level of parallelism can be achieved using the distributed reservation scheme of the present invention.

Although certain preferred embodiments have been shown and described, it should be understood that many changes and modification may be made therein without departing from the scope of the appended claims.

What is claimed is:

1. A microprocessor comprising:
    a plurality of execution units capable of executing instructions;
    a plurality of reservation stations coupled to said plurality of execution units, wherein each of said plurality of reservation stations is capable of storing a block of related instructions, wherein each said block of related instructions comprises less than six related instructions optimized to minimize dependencies between said related instructions;
    means for providing any of said related instructions in any of said plurality of reservation stations to any of said plurality of execution units; and
    a plurality of schedulers, each of said plurality of schedulers associated with a selected one of said reservation stations, wherein said each of said plurality of schedulers outputs a selected one of said related instructions to one of said plurality of execution units after resolving any dependency affecting said selected related instruction.

2. A microprocessor according to claim 1, wherein said each scheduler comprises means for determining when said dependency is resolved.

3. A microprocessor according to claim 2 wherein each said scheduler comprises an arbiter for obtaining access to any one of said executions units, when said dependency is resolved, in accordance with the type of said selected related instruction.

4. A microprocessor according to claim 3 further comprising an instruction cache for storing said block of related instructions prior to their input to said reservation stations.

5. A microprocessor according to claim 4 further comprising a cache scheduler, associated with said instruction cache for determining when dependencies are resolved for related instructions in a block of related instructions in said instruction cache, and for providing one of said related instructions having resolved dependencies to one of said plurality of execution units without storing said related instruction in one of said plurality of reservation stations.

6. A microprocessor according to claim 5 wherein at least one of said related instructions from a first block of related instructions is provided to a first one of said plurality of execution units concurrently with the provision of at least one other of said related instructions from a second block of related instructions to a second one of said plurality of execution units.

7. A microprocessor according to claim 6 wherein said dependencies comprise at least one of control dependencies, data dependencies and resource dependencies.

8. A method of executing instructions on a microprocessor included in a data processing system, comprising the steps of:

generating blocks of related instructions, each of said blocks of related instructions comprising less than six instructions optimized to minimize dependencies between said related instructions;

storing said blocks of said related instructions in a plurality of reservation stations;

scheduling said related instructions for execution on said microprocessor in accordance with a resolution of any dependency affecting said related instructions; and transferring any of said related instructions in any of said plurality of reservation stations to any one of at least one execution units included in said microprocessor when said dependency is resolved.

9. A method according to claim 8 wherein said step of scheduling comprises the step of determining when said dependency is resolved for related instructions in the same block.

10. A method according to claim 9 wherein said step of scheduling further comprises the step of arbitrating for access to any one of said execution units when said dependency is resolved in accordance with the type of said instruction.

11. A method according to claim 10 further comprising the step of determining, by a cache scheduler associated with an instruction cache, when dependencies are resolved for related instructions in a block of related instructions in said instruction cache, and for providing one of said related instructions having resolved dependencies to one of said plurality of execution units without storing said related instruction in one of said plurality of reservation stations.

12. A method according to claim 11 wherein at least one of said related instructions from a first block of related instructions is provided to a first one of said plurality of execution units concurrently with the provision of at least one other of said related instructions from a second block of related instructions to a second one of said plurality of execution units.

13. A method according to claim 12 wherein said dependencies comprise at least one of control dependencies, data dependencies and resource dependencies.

14. A data processing system comprising:

a main memory for storing microprocessor instructions to be executed on a microprocessor in said data processing system;

cache memory for storing said microprocessor instructions in said microprocessor;

a branch prediction circuit for predicting an outcome of any branch instructions in said microprocessor instructions, and for generating basic blocks of microprocessor instructions in accordance with said branch instructions;

a plurality of execution units capable of executing instructions;

a plurality of reservation stations coupled to said plurality of execution units, wherein each of said plurality of reservation stations is capable of storing a block of related instructions, wherein each said block of related instructions comprises less than six related instructions optimized to minimize dependencies between said related instructions;

means for providing any of said related instructions in any of said plurality of reservation stations to any of said plurality of execution units; and a plurality of schedulers, each of said plurality of schedulers associated with a selected one of said reservation stations, wherein said each of said plurality of schedulers outputs a selected one of said related instructions to one of said plurality of execution units after resolving any dependency affecting said selected related instruction.

15. A data processing system according to claim 14 wherein each said scheduler comprises an arbiter for obtaining access to any one of said plurality of execution units when said dependency is resolved in accordance with the type of said instruction.

16. A data processing system according to claim 15 further comprising a cache scheduler, associated with an instruction cache for determining when dependencies are resolved for related instructions in a block of related instructions in said instruction cache, and for providing said one of said related instructions having resolved dependencies to one of said plurality of execution units without storing said related instruction in one of said plurality of reservation stations.

17. A data processing system according to claim 16 wherein at least one of said related instructions from a first block is provided to a first one of said plurality of execution units concurrently with the provision of at least one other of said related instructions from a second block to a second one of said plurality of execution units.

18. A microprocessor operable to execute instructions, said microprocessor comprising:

a plurality of reservation stations that operate to store said instructions, said instructions optimized to minimize dependencies among related ones of said instructions; and a plurality of schedulers associated with said plurality of reservation stations, each of said plurality of schedulers operable to selectively output ones of said instructions to a same plurality of execution units as any other scheduler in response to resolving any dependency affecting said ones of said instructions.

19. The microprocessor as set forth in claim 18 wherein said plurality of schedulers further operate to determine when any dependency affecting said instructions is resolved.

20. The microprocessor as set forth in claim 18 wherein said plurality of schedulers further operate to obtain access to any one of said plurality of execution units as a function of instruction type.

21. The microprocessor as set forth in claim 18 further comprising an instruction cache that stores said instructions, said microprocessor further operable to input said stored instructions from said instruction cache to said plurality of reservation stations.

22. The microprocessor as set forth in claim 21 further comprising a cache scheduler that determines when dependencies are resolved among related ones of said instructions stored in said instruction cache.

23. The microprocessor as set forth in claim 22 wherein a first one of said related instructions is from a first block of related instructions and a second one of said related instructions is from a second block of related instructions, and wherein said first one of said related instructions is input from said instruction cache to a first execution unit and said second one of said related instructions is input from said instruction cache to a second execution unit, all under control of said cache scheduler.

24. The microprocessor as set forth in claim 18 wherein at least one of said dependencies among related ones of said instructions is one of a control dependency, a data dependency and a resource dependency.

25. A data processing system comprising:
    a memory that operates to store instructions; and
    a microprocessor operable to execute said stored instructions, said microprocessor comprising (i) a plurality of reservation stations that operate to store said instructions, said instructions optimized to minimize dependencies among related ones of said instructions, and (ii) a plurality of schedulers associated with said plurality of reservation stations, each of said plurality of schedulers operable to selectively output ones of said instructions to a same plurality of execution units as any other scheduler in response to resolving any dependency affecting said ones of said instructions.

26. The data processing system as set forth in claim 25 wherein said plurality of schedulers further operate to determine when any dependency affecting said instructions is resolved.

27. The data processing system as set forth in claim 25 wherein said plurality of schedulers further operate to obtain access to any one of said plurality of execution units as a function of instruction type.

28. The data processing system as set forth in claim 25 wherein said microprocessor further comprises an instruction cache that stores said instructions, said microprocessor further operable to input said stored instructions from said instruction cache to said plurality of reservation stations.

29. The data processing system as set forth in claim 28 wherein said microprocessor further comprises a cache scheduler that determines when dependencies are resolved among related ones of said instructions stored in said instruction cache.

30. The data processing system as set forth in claim 29 wherein a first one of said related instructions is from a first block of related instructions and a second one of said related instructions is from a second block of related instructions, and wherein said first one of said related instructions is input from said instruction cache to a first execution unit and said second one of said related instructions is input from said instruction cache to a second execution unit, all under control of said cache scheduler.

31. The data processing system as set forth in claim 25 wherein at least one of said dependencies among related ones of said instructions is one of a control dependency, a data dependency and a resource dependency.

32. The data processing system as set forth in claim 25 further comprising a branch prediction circuit that operates to predict an outcome of any branch instructions in said instructions.

33. The data processing system as set forth in claim 32 wherein said branch prediction circuit further operates to generate instructions in accordance with said branch instructions.

34. The data processing system as set forth in claim 25 wherein said microprocessor further comprises a plurality of execution units capable of executing said instructions.

35. A method of operating a microprocessor to execute instructions, said method of operation comprising the steps of:
    storing said instructions in a plurality of reservation stations, said instructions optimized to minimize dependencies among related ones of said instructions;
    determining, with a plurality of schedulers, when any dependency affecting said instructions is resolved; and
    selectively outputting, with each of said plurality of schedulers, ones of said instructions to a same plurality of execution units as any other scheduler in response to resolving any dependency affecting said ones of said instructions.

36. The method of operating a microprocessor to execute instructions as set forth in claim 35 wherein said microprocessor comprises an instruction cache that stores said instructions and said method of operation further comprises the step of inputting said stored instructions from said instruction cache to said plurality of reservation stations.

37. The method of operating a microprocessor to execute instructions as set forth in claim 36 wherein said microprocessor comprises a cache scheduler and said method of operation further comprises the step of determining when dependencies are resolved among related ones of said instructions stored in said instruction cache.

\* \* \* \* \*